Patented Aug. 2, 1932

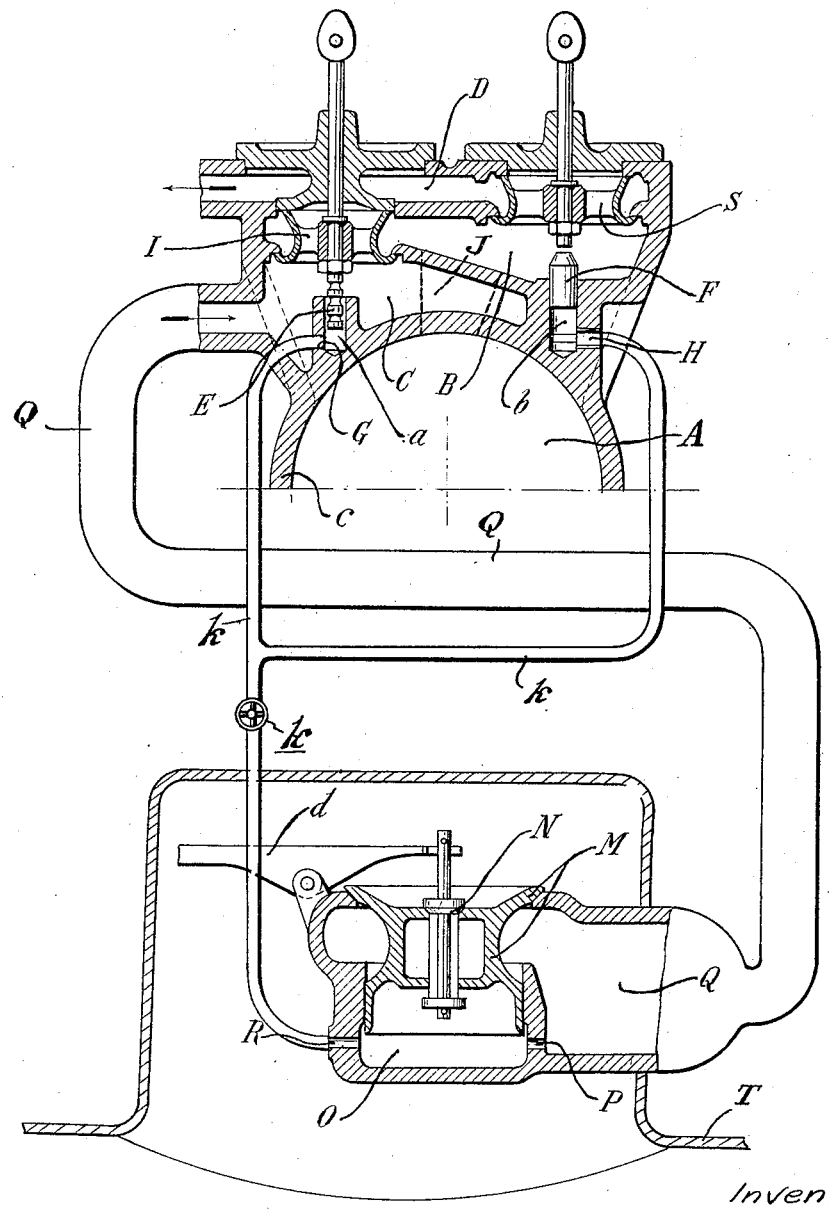

1,869,463

UNITED STATES PATENT OFFICE

ARTURO CAPROTTI, OF MILAN, ITALY

POPPET VALVE FOR STEAM DISTRIBUTING GEARS

Application filed August 23, 1927, Serial No. 214,912, and in Italy August 25, 1926.

This invention relates to poppet valves for reciprocating steam engines and like engines working with an elastic fluid supplied to the cylinder at the working pressure and consists in producing the closure of the valves, hitherto produced by retrieving springs, by means of the pressure of the working fluid itself.

The invention further consists in an arrangement whereby the valve closing action of the working fluid can be cut off so as to leave the valves fully open and provide a simple and efficient by-pass for the working fluid.

In order to attain the objects set forth, the present invention makes use of the fact that one of the ends of the valve stem passes out freely into the atmosphere and that, on one side, the section of these stems is subjected to atmospheric pressure, and it establishes at the desired moment on the other side of this section, the pressure of the power fluid so that this section being then subjected to the difference between the said pressures, is in fact, pushed in the direction which corresponds to the closure of the corresponding valves. This effect is obtained, according to the present invention, by providing small cylindrical chambers or recesses in which slide extensions of the valve stems, and into these chambers, according to the circumstances, power fluid under pressure from the generator is or is not transmitted.

The accompanying drawing illustrates one embodiment of the invention as applied to any double acting reciprocating poppet valve steam engine.

The drawing shows a cross section through a part of the engine cylinder, the section being taken along a plane including the axis of the inlet valve I and that of the exhaust valve S, controlled by any suitable valve operating mechanism, such as cams engaging the outer ends of the valve stems, which valves are arranged respectively for putting the chamber B, connected with the interior A of the cylinder through the duct J shown in dotted lines, into communication with the valve chest C and with the exhaust duct D.

According to the present invention the stem of the admission valve I is provided with a tail or extension E which slides with slight peripheral clearance into a recess $a$ bored in the cylinder casting $c$ into which recess steam is admitted through the hole G and thus lifts the valve towards its seating. The valve S can also be lifted by a piston F moving in another recess $b$ into which steam enters through a hole H. The holes G and H are connected by the piping or duct K, controlled by the valve $k$, with the orifice R in the casing of the throttle valve M, so that steam is admitted to the cylindrical chambers or recesses $a$ and $b$ under certain conditions, which will be explained further on.

The difference in construction and operation existing between the tail E which slides with clearance in the chamber $a$ and the piston F which has a close sliding fit in the chamber $b$, depends upon the fact that in the chamber B the pressure is very varying and is only equal to that in the boiler upon admission, while in the admission chamber C, when a pressure exists, this pressure is in fact equal to that in the boiler, and consequently there is practically no difference in pressure between the chambers $a$ and C, and leakages from one to the other are permissible and even useful for the purposes of the invention, while this would not be permissible for the chambers B and $b$ and the valves S. Moreover the clearance around the tail E serves for utilizing, during the operation with open regulator, the pressure existing in C itself without it being then necessary to lead the power fluid into $a$ and $b$ through the piping or duct K. This will appear clearly from the following description.

The drawing shows an intake valve for admitting steam from the boiler T, used in conjunction with a main balanced throttle valve of known design. In this figure, M is the main throttle valve which closes tightly on a single seat and is formed with a lower cylindrical portion moving with slight play in a corresponding cylindrical bore. N is an auxiliary valve closing on the main throttle M. The valve N, which is rigidly connected to the main valve operating lever $d$, is arranged to have a certain amount of lost motion before opening the valve M, thus allowing, on first opening the pilot valve N, live steam from the boiler to pass into the balancing chamber O under the main valve M, which operation balances the pressures on both sides of the valve.

This valve has also the well known function of serving for starting, because if the valve N is opened while leaving the valve M closed, steam passes through a small hole P in the pipe Q leading to the chamber C of the valve chest. In this pipe it gradually reaches, in course of time, the boiler pressure.

In order to carry the invention into effect, steam is tapped from the chamber O through another hole R connecting it with suitable piping to the holes G and H, so that as soon as the regulating piston valve is opened and before the pressure in Q has attained an appreciable value, the pressure in the chamber O, having reached boiler pressure, transmits it to the recesses $a$ and $b$ in which move the tail E of the inlet valve and the piston F of the exhaust valve respectively.

The operation of the arrangement above described is as follows:

When the regulator is closed, there is no pressure in the recesses $a$ and $b$ carrying the tail E and piston F; nor is there any pressure in the valve chest C connected with the pipe Q; so that neither the tail E nor the piston F, nor in consequence, the stems of the valves I and S, are subjected to any upward thrust due to differences in pressure, and both valves therefore remain fully open by virtue of their weight. Under these conditions, fluid enclosed in the cylinders can be moved by the piston in its reciprocating motion from one end to the other without meeting any appreciable resistance (by-pass action).

As soon as the regulator is opened in order to start the engine, the pilot valve N establishes boiler pressure in the chamber O and, before any appreciable pressure is reached in C by the steam wire drawing through the hole P in the pipe Q, the pressure in the recesses $a$ and $b$ becomes sufficient to lift the valves I and S to their seats. These valves are consequently lifted and take up their respective instantaneous working positions, that is to say bearing upon the tappet or valve operating cams.

The engine is thus in a condition to start and operate regularly. The sections of the stem of the valve I and of the piston F are chosen so that the pressures in C and in the recess or chamber $b$ of the piston F will be largely sufficient to secure for both of the valves I and S the maximum closing accelerations required by the valve operating mechanism and by the speed of the engine. When the engine is running, with the regulator open, the piston F moves continually in its recess, but the tail E only operates during starting, and in running positions under steam it is only acted upon by the pressure differences, which are often very slight, in its recess $a$ and in the chamber C. Thus, the pressure of the steam in the recess $a$, acting on the tail or extension E of the stem of valve I, normally tends to seat the latter against the unseating action of the cam bearing on the outer end of the valve stem.

The clearance between the tail E and the sides of the recess $a$ in which it moves provides an easy construction, avoids unnecessary contact and consequent friction but causes no steam loss as the steam issuing from the recess around E enters the valve chest C and is thus made to work in the cylinder.

As soon as the engine has been started the direct connections K between G and H and O may be closed by closing the cock $k$ because, on account of the peripheral clearance around the tail E, the boiler pressure existing in C can exert the same action in the chamber $a$ and, through the communication provided by the piping or duct K between this chamber and the chamber $b$, it can also exert the same action in the latter so as to maintain the valve S in its working position.

This direct connection is, however, necessary for starting purposes and in order to prevent, when the regulator is first opened, the small amount of steam issuing through the same and entering C from being exhausted through the fully open admission valve, without permitting the pressure in C to build up to a value which is sufficient to bring the open valve first of all into its regular working position.

The result to be obtained is a preliminary admission of fluid under pressure into the chambers $a$ and $b$, immediately before the full admission into the chamber C takes place, and the type of regulator shown in Fig. 2 serves to show the manner in which such an operation may be carried out automatically by means of a steam supply through a balanced valve. But it is obvious that, provided the same result is obtained, instead of the pilot valve regulator above described, any other throttle valve may be employed in which steam is brought to boiler pressure in an equilibrium chamber on first opening the throttle.

The diagrammatic arrangement shown in drawing represents one of the many embodiments of the invention and modifications in its form and details may be made without on that account going outside the scope of the invention.

What I claim is:

1. A poppet valve mechanism for reciprocating steam engines comprising a valve casing, a steam chest in the casing, a connection between the chest and a source of steam under pressure, an inlet poppet valve in the steam chest for admitting steam to the engine cylinder, a stem carried by the valve, said stem having its outer end passing out to the free atmosphere, a chamber having one open end in the wall of the steam chest, a tail on the inner end of the valve stem entering said chamber and circumferentially spaced apart from the wall of said chamber, and a duct connecting the closed end of the chamber with the source of steam under pressure.

2. A poppet valve mechanism for reciprocating steam engines, comprising a valve casing, a steam chest in the casing, a connection between the chest and a source of steam under pressure, an exhaust chest in the valve casing, an inlet poppet valve in the steam chest and an exhaust poppet valve in the exhaust chest, each valve having a stem, the outer end of the stem of each valve passing out to the free atmosphere, a chamber having one open end formed in both the steam chest and the exhaust chest, a duct connecting the closed end of each chamber with the source of steam under pressure, a tail rigid with the inner end of the inlet valve stem and entering the chamber in the steam chest and circumferentially spaced from the wall of said chamber, and a loose piston sliding in the chamber of the exhaust chest and coacting with the inner end of the exhaust valve stem.

3. A poppet valve mechanism for reciprocating steam engines, comprising a valve casing, a steam chest in the casing, a connection between the chest and a source of steam under pressure, an exhaust chest in the valve casing, an inlet poppet valve in the steam chest and an exhaust poppet valve in the exhaust chest, each valve having a stem, the outer end of the stem of each valve passing out to the free atmosphere, a chamber having one open end formed in both the steam chest and the exhaust chest, a duct connecting the closed end of each chamber to the source of steam under pressure, a duct connecting the closed ends of the chambers to each other, a tail rigid with the inner end of the inlet valve stem and entering the chamber in the steam chest and circumferentially spaced from the wall of said chamber, and a loose piston sliding in the chamber of the exhaust chest and coacting with the inner end of the exhaust valve stem.

4. A poppet valve mechanism as claimed in claim 3, further comprising means for shutting off the duct connection between the steam supply and the chambers in the steam and exhaust chests, while allowing the duct connection between the two chambers to remain open.

5. A poppet valve mechanism for reciprocating steam engines, comprising a valve casing, a steam chest in the casing, a connection between this chest and a source of steam under pressure, an exhaust chest in the valve casing, an inlet poppet valve in the steam chest for admitting steam to the said engine and an exhaust poppet valve in the exhaust chest, each valve having a stem, the outer end of the stem of each valve passing out to the free atmosphere, a chamber having one open end formed in each of the steam and exhaust chests, a tail rigid with the inner end of the inlet valve stem and loosely entering the chamber in the steam chest and a piston sliding in the chamber in the exhaust chest and coacting with the inner end of the exhaust valve stem, in combination with a balanced intake throttle valve comprising a valve body, a main valve in this valve body, a balancing chamber in the valve body, a pilot valve mounted on the main valve and controlling the supply of steam to this balancing chamber, a duct connection between the balancing chamber and the closed ends of the chambers in the steam and exhaust chests in the poppet valve casing, the pilot valve being arranged to open before the main valve and close after the main valve.

6. A poppet valve mechanism as claimed in claim 5 further comprising a duct connection between the said chambers in the steam and exhaust chests, a valve on the duct connection between the throttle valve and the said chambers, whereby the supply of steam direct from the throttle valve to the said chambers can be cut off while leaving the throttle valve and the duct connection between the two chambers open.

In testimony whereof I affix my signature.

AUTURO CAPROTTI.